United States Patent [19]

Shrawder

[11] Patent Number: 4,892,505

[45] Date of Patent: Jan. 9, 1989

[54] METHOD AND APPARATUS FOR AUTOMATIC CORN COB REDUCTION

[76] Inventor: Larry Shrawder, R.D. #2, Kempton, Pa. 19529

[21] Appl. No.: 313,225

[22] Filed: Feb. 21, 1989

[51] Int. Cl.$^4$ .............................................. A01F 11/06
[52] U.S. Cl. ...................................... 460/149; 460/46; 56/DIG. 2
[58] Field of Search ....................... 460/32, 39, 40, 41, 460/46, 49, 149; 56/DIG. 2, DIG. 5

[56] References Cited

U.S. PATENT DOCUMENTS

| | | | |
|---|---|---|---|
| 2,628,621 | 2/1953 | Murdoch | 460/149 |
| 2,826,031 | 3/1958 | Hansen | 460/29 |
| 3,401,727 | 9/1968 | Blanshine et al. | 460/46 |
| 4,291,521 | 9/1981 | Haake | 460/42 |
| 4,373,536 | 2/1983 | da Silva | 460/46 |
| 4,532,940 | 8/1985 | Mitkov et al. | 460/46 |
| 4,600,019 | 7/1986 | McBroom | 460/101 |

Primary Examiner—Jerome W. Massie, IV
Assistant Examiner—Terry Lee Melius
Attorney, Agent, or Firm—Leonard M. Quittner

[57] ABSTRACT

A combine is improved to reduce corn cobs to usable segments automatically by changing the combine arc to circular and adjusting its clearance and altering its cross bar spacing; changing the straw walker sieve slots and adding a cob conveyer adjacent to the cleaning shoe.

7 Claims, 4 Drawing Sheets

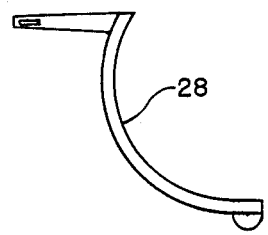
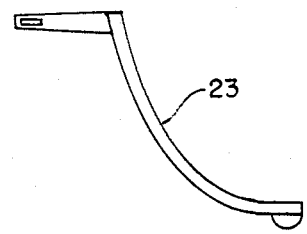
FIG. 2a  FIG. 2b
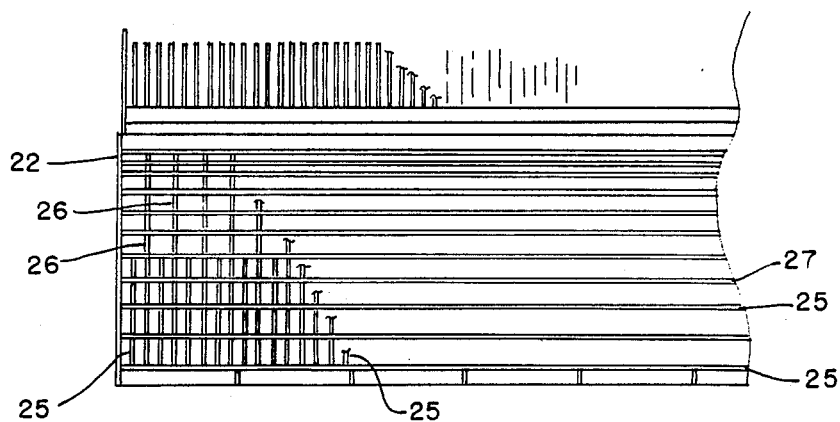
FIG. 3

FIG. 5
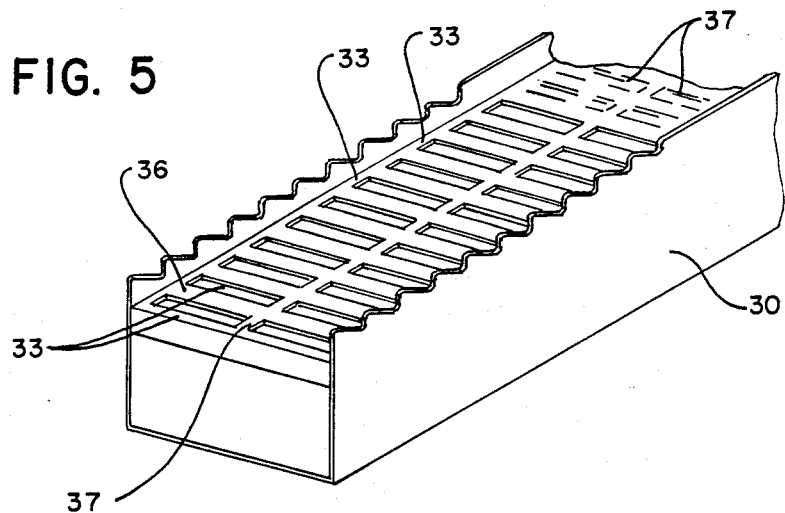
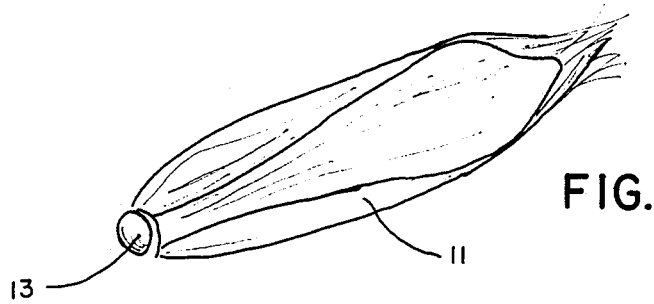
FIG. 6a
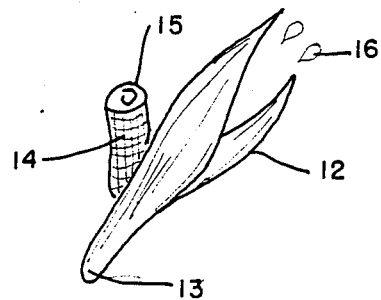
FIG. 6b
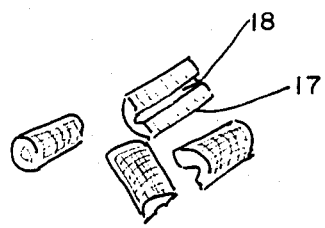
FIG. 6c

METHOD AND APPARATUS FOR AUTOMATIC CORN COB REDUCTION

CROSS-REFERENCE

There are no cross-reference to, nor are there any, related applications.

FEDERALLY-SPONSORED RIGHTS

The invention herein was made without any Federal sponsorship or contribution.

BACKGROUND OF THE INVENTION

1. The Field of the Invention.

The invention deals with the separation automatically of corn cobs from an improved combine.

2. Description of the Prior Art.

Combines are useful in retrieving shelled corn or kernels from ears and for disposing of cobs, husks, stalks and chaff generally onto the ground. Certain types of corn feed include cobs are ground with the kernels as a roughage source. In this instance, no attempt is made during the threshing or subsequent phases of combine operation to preserve the cob in a useful shape or to prevent otherwise unacceptable bruising of the kernel since the resultant mixture of cob and shelled corn is ground and stored as silage. No thought is given to what the cob looks like.

Cobs, more particularly reduced cob segments, have been found to have uses of considerable importance which in some instances may even approach the value of the corn. For example, a cob which has been fractured into an approximately wedge shaped rod segment to expose the pit hand have a defined length less than 3 inches is useful as a growing medium, for example in mushroom culture, because of the carbohydrate content. Cobs in this form are also desirable as ornamental mulch and have found uses as non-harmful industrial abrasives and absorbents. The construction industry has also recognized that cob segments can be used as a light weight aggregate. Other uses for cob segments are as a water separator in alcohol production, a clean burning non sulphurated fuel, as a source for chemicals such as the amino acid choline, oxalic acid and xylitol. The list is extensive and grows daily.

The combine art has dealt with separation of components from the ear. U.S. Pat. No. 55,899 to Pendexter, June 26, 1866 represents much of the state of the art. More modern combines are demonstrated in U.S. Pat. No. 2,826,031 to Hansen, Mar. 11, 1958 and U.S. Pat. No. 2,957,293 to Roscoe et al, Oct. 25, 1960. Separation improvements are demonstrated in U.S. Pat. No. 2,518,302 to Gerber Aug. 8, 1950, U.S. Pat. No. 4,291,521 to Haake Sept. 29, 1981 and U.S. Pat. No. 4,600,019 to McBroom, July 15, 1986. See also, U.S. Pat. No. 611807 to Donovan, Oct. 4, 1898.

Corn cob crushing or reducing as a separate process after retrieval by hand gathering is shown in U.S. Pat. No. 2,853,247 to Anderson, Sept. 23, 1958. Cob segment grading to defined sizes is demonstrated in U.S. Pat. No. 4,053,112 to Vanderhooven et al wherein a stand alone mechanism and process for grading, sorting and reducing cob segments is described.

The retrieval of cobs directly and automatically in the field from the combine separate from the corn in usable reduced shapes for immediate use remained elusive in any practical sense until the present invention.

The realization that corn cobs have significant economic value apart from filler for feed has created a need for retrieving the cobs during threshing. In response thereto your inventor invented modifications to existing combines which not only make the retrieval of cobs automatic but reduce them in size, shape and cleanliness at the same time in condition for resale to industrial users.

SUMMARY OF THE INVENTION

The present invention modifies a standard combine to permit the production and cleaning of reduced cob segments into useful shapes automatically in the field. Such shapes have a wedge shaped cross-section and do not exceed 2-3 inches in length with the pith intact but exposed. This enables the farmer to procure a significantly better price in an immediately available market than he would get if he sold unreduced cobs for reprocessing.

Your applicant's invention is an improved, reduced cob segment cleaning means within the combine automatically and is the combination of altering the shape of the concave to circular from elliptical, altering the spacing in the concave screen to enable the corn to escape crushing but permit reduction into cob segments, providing improved separation means by changing the configuration of the straw walker in a conventional combine or the concave and beater grate of a rotary combine, installing an improved cob segment cleaning and separating means disposed at the discharge end of the cleaning shoe for delivery, cleaning and collection of the reduced cob segments, free of the debris of threshing and ready for resale.

The apparatus modifications and the process of the invention create a fully automatic system for cob segment processing.

An object of the invention is to reduce cobs into segments in the combine automatically in the field and to separate, clean and retrieve them.

A further object of the invention is to reduce the segments into marketable shapes without crushing or bruising the shelled corn.

Another important object is to provide the highest cash yield to the farmer utilizing the invention by permitting him to market reduced cob segments directly from his field and to allow recovery of shelled corn in unbruised condition thereby maximizing its grade and quality.

Other objects, advantages and features of the present invention will be apparent to those skilled in the art from the following description taken in conjunction with he accompanying drawings.

DESCRIPTION OF DRAWINGS

FIGS. 2a, 2b and FIG. 3 address modifications to the concave.

FIG. 5 shows a modification of a straw walker in a conventional combine.

FIGS. 6A–6C are an informational depiction of the parts of a corn ear and the cob segments which will typically result from practicing of the invention.

DESCRIPTION OF THE PREFERRED EMBODIMENT

Figure 1:
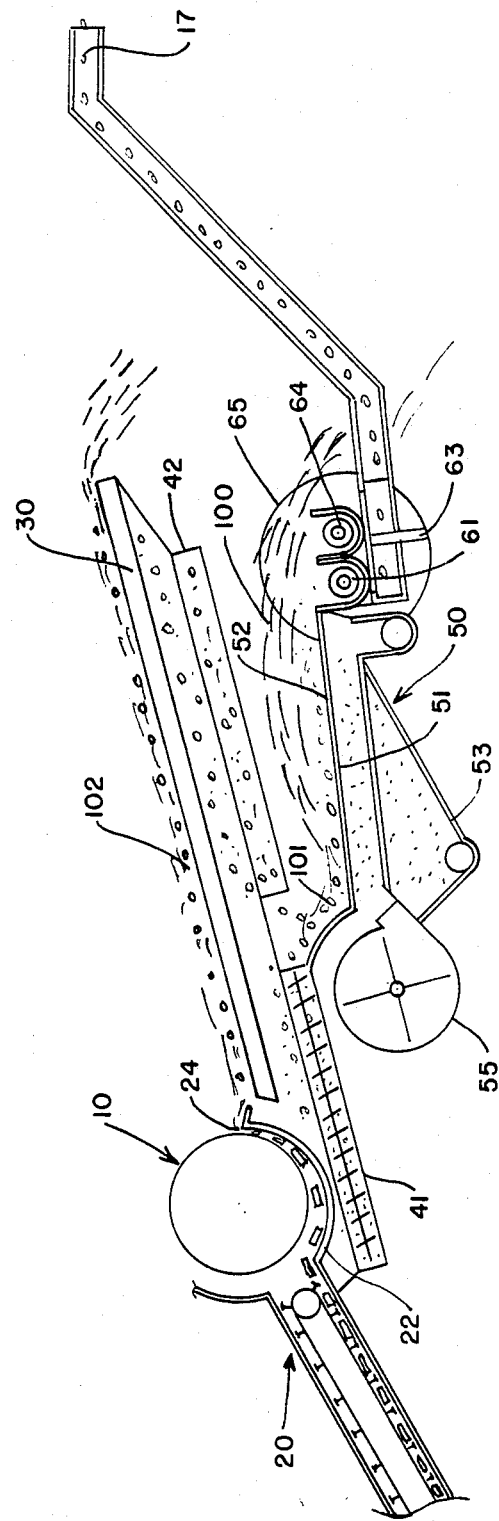
FIG. 1 shows in skeletal form the interaction of the combine parts as modified by the invention.

See FIGS. 1 and FIGS. 6. In conventional operation a front loading combine 10 receives for threshing an ear of corn 11 which is comprised of a husk 12, a stalk 13 and kernels 14 on a cob 15 which become shelled corn 16 during threshing for feed. Threshing is accomplished between a concave 20 and the cylinder 21 acting by rotation and compression in combination. The concave has arcs 22 disposed in parallel which are typically elliptical 23, see FIG. 2, to enhance the threshing action by varying the compression clearance 24 between cylinder an concave as required by subsequent crop processing.

The concave is a screen disposed between the arcs which has horizontal bars 25 and vertical rods 26 spaced to permit shelled corn to drop onto a lower clearing conveyer 41 for transport to a cleaning shoe 50. The husks, cobs, stalks and any remaining shelled corn are conveyed to a straw walker 30 from which the remaining shelled corn is retrieved through perforations 32 in the surface 31 of the straw walker and sent to the cleaning shoe by an upper clearing conveyer 42. The chaff, namely husks, cobs, stalks are expelled generally onto the ground to be plowed under. The shelled corn is further cleaned of chaff, mostly stalk fragments and debris in the cleaning shoe which has a sieve 51 on the surface of which are direction orienting fins 52 parallel to the line of travel 54 of the cleaning shoe to comb the shelled corn free of stalks and a collecting pan means 53 below the sieve for collecting the shelled corn. The cleaning shoe has a fan 55 for blowing debris 56 out of the combine. Cobs are gathered from the ground by hand if wanted. Not shown is the rotor type combine which accomplishes the same result but without a straw walker. In the rotary combine, the concave forms a partly slotted tubular chamber of bars and rods for threshing which leads to a tubular perforated paddle or beater containing section which replaces the straw walker. It will be apparent that the modifications described herein although for a conventional combine will easily be understood and adaptable to a rotary combine.

In the instance of feed to be ground with cobs, the clearance 24 can be adjusted so as to crush the cobs and kernels into a coarse mash for subsequent milling and storage in a silo.

Industrial demand for cob segments generally requires that the cobs be reduced in length to less than three inch rods but not less than approximately one half inch. The cob segment 17 is preferably split along its length into wedge shapes wherein the pith 18 is exposed. This enhances moisture capture by the pith and facilitates sterilization in those applications which require the killing of corn nematodes and the like resident therein.

Figure 4:
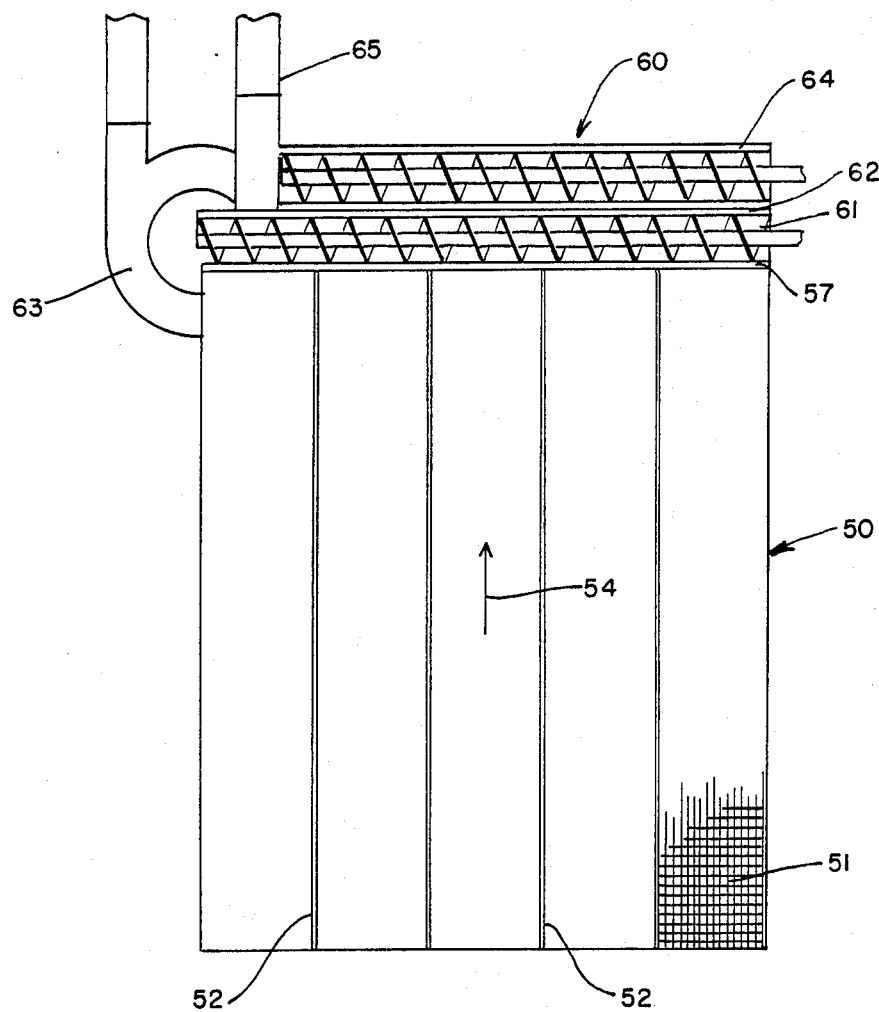
FIG. 4 shows the modification of an improved cleaning means inclusive of the cleaning shoe.

The modification of the invention comprises the addition of cob segment and secondary cleaning and separating means 60, see FIG. 4, in a defined location adjacent to the cleaning shoe 50 and changes to the concave 20 and the straw walker 30 or the concave and beater grate in a rotary combine. The cob separator consists preferably of an auger 61 mounted in an open top auger sleeve 62 coupled to a blower 66 and the secondary cleaning means of an auger 64 and blower 65 for retrieving stalks.

The concave arcs can be made circular 28 from elliptical 23 on a form. Circular configurations are known in the trade and purchasable as well. The concave screen must be altered significantly however to permit cob reduction to size and shape with a minimum amount of bruising to the shelled corn so as to keep its grade high. The vertical rods 25 define cob segment length in combination with the compression clearance 54. It has been found that removing alternate rods 26 in the typical screen commercially available from about the sixth bar 27 in from the front of the concave fields satisfactory results. Removing bars too near the front will increase undesirable fractures. By making the spacings as indicated, the great bulk of reduced cob segments will go to the cleaning shoe directly.

The straw walker perforations require substantial alteration to permit retrieval of cob segments which may find their way there from the concave. This is accomplished preferably by reducing the number of ranks 33 of perforations by cutting away rank side partitions 36 between them thereby substantially making the perforations wider to permit the segments to fall through. Optionally the ranks can be left intact and the row side partitions 37 can be cut away to create essentially square perforations.

See FIG. 4. The cleaning means is modified by installing the cob auger 61 adjacent to the cleaning shoe discharge end 57 perpendicular to the line of travel 54. It is preferred that the auger have a diameter not exceeding about ten inches and the auger sleeve be mounted with the least clearance possible at the discharge end such that cob segments will fall into the auger and stalks will ride over the auger to the secondary cleaning means 64 and its blower 65. A blower 66 means at the end of the cleaning auger will permit transport of the reduced cob segments externally of the combine. It is understood that the secondary cleaning means is not restricted to an auger but could be an additional cleaning shoe to separate stalks from cob segments to prevent recontamination of the cobs and to keep the adjacent combine parts clean.

In conventional operation, the ear is threatened into its components at the concave wherein the cobs are reduced to size and shape on the screen and force through the screen. From the screen a first portion 101 of threshed material which consists of cob segments and shelled corn is dropped on the cleaning shoe. A second portion 102 consisting of husks, stalks, cob segments and some shelled corn is transported onto the straw walker where cob segments and feed corn fall through the perforations and are transported 42 back to the cleaning shoe.

On the top of the cleaning shoe sieve 51 disposed between the fins 52 will be found only cob segments, debris and longitudinally oriented stalk fragments which are substantially longer than the cob segments. The chaff 100 is blown away by the cleaning shoe fan 55 and cleaning shoe action will drop shelled corn into the pan 53 and carry the balance of cob segments and stalk fragments to the shoe discharge end. The stalk fragments will ride over the cob auger and sleeve to the secondary cleaning auger and the cleaned cob segments will fall into the cob auger thereby effecting separation. The stalks will be removed by the secondary cleaning auger 64 so as not to recontaminate the cleaned cobs.

What is claimed is:

1. A method of reducing cleaned corn cobs into reduced segments and separating the segments from chaff in a combine which has been modified comprising the steps of:

(a) feeding a corn ear having a husk, a stalk, kernels of shelled corn and a cob into the combine having a concave having arcs, a multiplicity of longitudinal bars disposed perpendicular to the arcs and evenly spaced vertical rods parallel to the arcs to form a screen, the combine further having a cylinder, an arc to cylinder adjustment means, a perforated straw separating means and a cleaning means consisting essentially of a cleaning shoe with a defined travel line and having a sieve with a multiplicity of orienting fins above the sieve parallel to the travel line and a pan below the sieve, wherein the combine modification comprises:
 (1) changing the concave's configuration from elliptical to circular;
 (2) adjusting the space between the cylinder and concave to a clearance sufficient to reduce the corn cobs into segments;
 (3) removing alternate vertical rods from the concave beginning with at least the fifth horizontal bar from the front of the concave;
 (4) modifying the straw separating means by enlarging the perforations thereof;
 (5) installing, adjacent to the cleaning shoe at its discharge end, a cob segment separating and cleaning means;
(b) threshing the ear into shelled corn and chaff consisting of husk, stalk, cob and debris;
(c) reducing the cob between the cylinder and concave into segments which expose pith and are of a defined length;
(d) separating at the concave, the cob segments and chaff into a first and second portion, the first portion consisting essentially of shelled corn and cob segments and the second portion consisting essentially of cob segments, husk, stalk and debris;
(e) conveying from the concave the first portion to the cleaning shoe;
(f) separating at the cleaning shoe the first portion into cob sections and shelled corn;
(g) collecting the shelled corn on the cleaning pan;
(h) conveying from the concave the second portion onto the straw separating means;
(i) separating in the straw separating means cob segments from the second portion husk, stalk and debris;
(j) disposing of the second portion husk and most of the second portion stalk and debris;
(k) conveying the second portion cob segments and remaining stalk and debris to the cleaning shoe;
(l) orienting the stalk on the cleaning shoe sieve by the fin means such that it travels longitudinally;
(m) transporting the cob segments to the cob separating means;
(n) separating the stalk and debris from the cob segments by cob cleaning means;
(o) disposing of the stalk and debris; and
(p) collecting the cob segments.

2. A modified combine as in claim 1 wherein the arc to cylinder adjustment means is set to reduce cob segments to between one half and three inches.

3. A modified combine as in claim 1 wherein the straw separating means is a straw walker whose perforations are enlarged to permit cob segments to pass through such perforations.

4. A modified combine as in claim 1 wherein the straw separating means is a concave and beater grate of a rotary combine whose perforations are enlarged to permit cob segments to pass through such perforations.

5. A modified combine as in claim 1 wherein the cob segment separating means is an auger.

6. A modified combine as in claim 5 wherein the cob conveyer is an auger whose diameter is less than 10 inches.

7. A modified combine as in claim 1 where the cob cleaning means is an auger adjacent to the cob separating means.

* * * * *